United States Patent Office 3,300,814
Patented Jan. 31, 1967

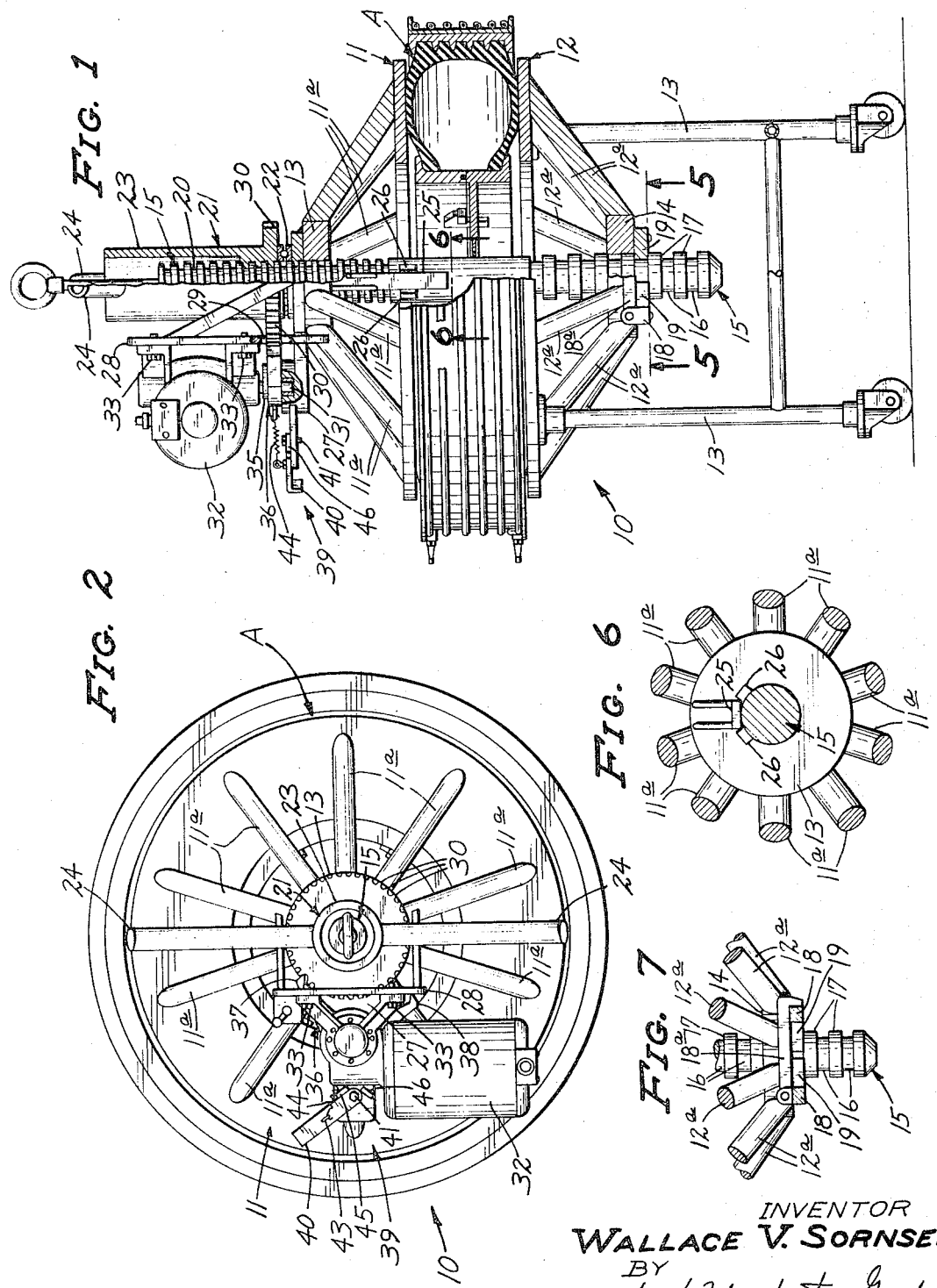

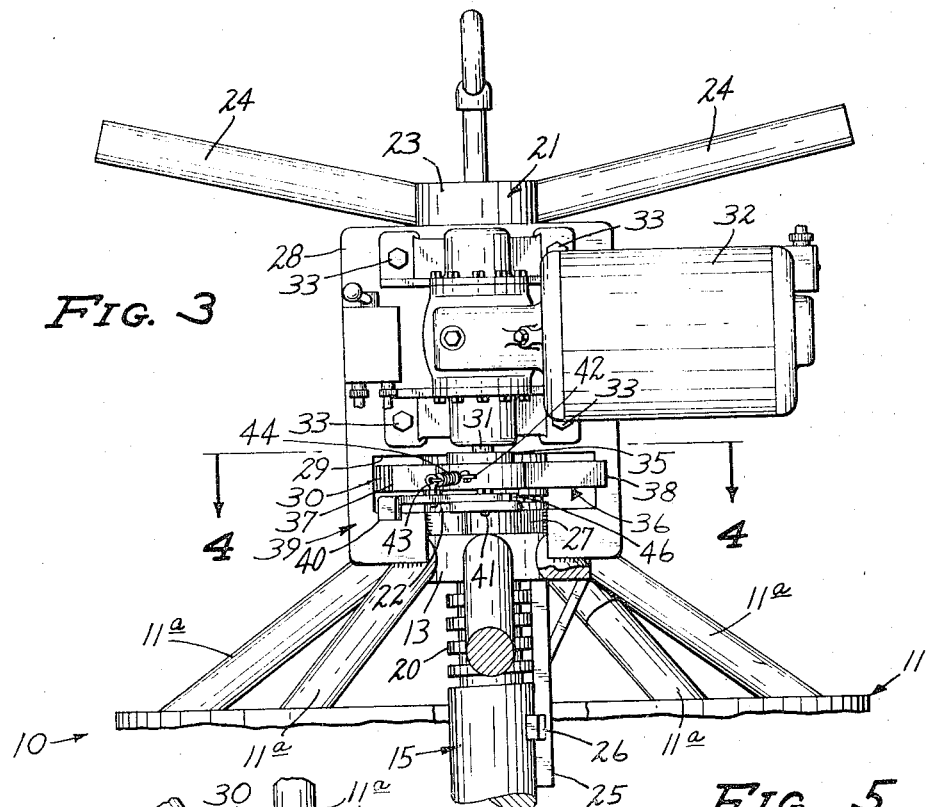
FIG. 3
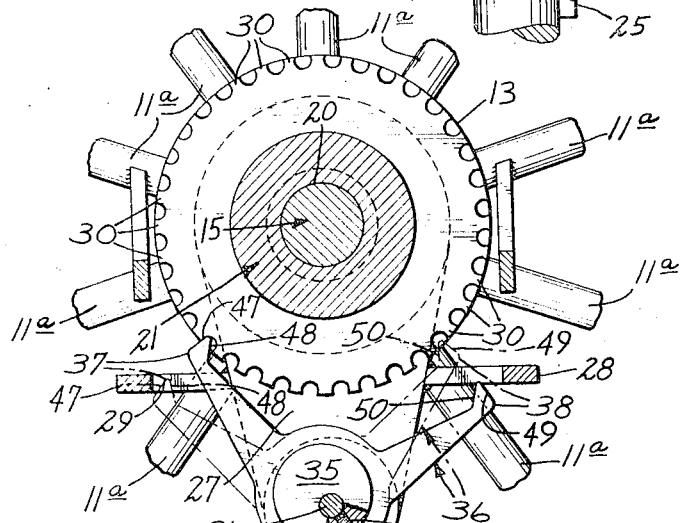
FIG. 4
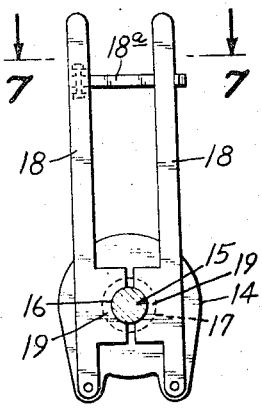
FIG. 5
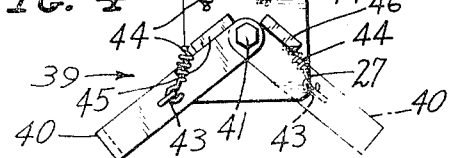
INVENTOR.
WALLACE V. SORNSEN
BY
Merchant, Merchant & Gould
ATTORNEYS

3,300,814
POWER OPERATED RETREAD TIRE PRESS
Wallace V. Sornsen, Minneapolis, Minn., assignor to Paul E. Hawkinson Company, Minneapolis, Minn., a corporation of Minnesota
Filed Oct. 13, 1964, Ser. No. 403,580
2 Claims. (Cl. 18—18)

My invention relates generally to improvements in tire retreading apparatus, and more particularly to novel power means for imparting clamping movements to tire presses or tables of the type disclosed in Patent 2,743,481.

The primary object of my invention is the provision of a device of the class above described which is designed to selectively impart clamping and unclamping pressure to the opposed clamping plates.

A further object of my invention is the provision of a device of the class immediately above described which may be secured to a normally manually operated tire press or table with a minimum of modification and expense.

A further object of my invention is the provision of a device of the class described which is compact in size, which is relatively light in weight, which incorporates but a minimum of working parts, and which is relatively trouble-free in operation.

The above and still further objects of my invention will become apparent from the following detailed specification, appended claims, and attached drawings.

Referring to the drawings wherein like characters indicate like parts throughout the several views:

FIG. 1 is a view partly in side elevation and partly in vertical axial section of a conventional tire press showing my invention in use thereon;

FIG. 2 is a view in top plan;

FIG. 3 is a fragmentary view in side elevation as seen from left to right of FIG. 1, portions thereof being broken away and shown in section, on an enlarged scale;

FIG. 4 is a view in horizontal section as seen from the line 4—4 of FIG. 3;

FIG. 5 is a fragmentary view in horizontal section as seen from the line 5—5 of FIG. 1;

FIG. 6 is a view in horizontal section as seen from the line 6—6 of FIG. 1, on an enlarged scale; and FIG. 7 is a view in section as seen from the line 7—7 of FIG. 5.

Referring with greater particularity to the drawings, the press 10, of conventional design, comprises a pair of opposed horizontally disposed upper and lower clamping plates 11, 12, the latter of which serves as a table which is supported by roller-equipped legs 13. Clamping plates 11, 12 are annular in shape and each thereof includes spider arms 11a, 12a, respectively, which terminate in annular heads 13, 14 at their axes. Adapted to be received within the aligned openings of the heads 13, 14 when a pneumatic tire casing A is received between the upper and lower pressure plates 11, 12, is a screw element 15, the lower end portion of which is formed to define a plurality of axially spaced annular grooves 16 which define collars 17 therebetween.

As shown, the head 14 carried by the lower clamping plate or table 12 has mounted thereon a pair of arms 18 pivotally mounted for horizontal movements and which at their inner ends define opposed jaws 19 which are of a size to be selectively received in the annular groove 16 whereby to lock said head 14 and screw element 15 together against relative axial movement. Locking of the arms 18 so as to maintain the jaws 19 in the grooves 16 is accomplished through the medium of the hook-like latch bar 18a.

Having threaded engagement with the threads 20 on the upper end portion of the screw element 15 is a nut 21 which operatively brings pressure to bear upon the head 13 through the medium of an axial thrust bearing 22. The nut 21 is formed to define an upstanding tubular extension 23 which loosely encompasses the upper end portion of the screw element 15 and terminates at its upper end in circumferentially spaced radially outwardly projecting arms 24 which may be used to manually exert clamping and unclamping pressure to the plates 11, 12. Forming no part of the instant invention but limiting relative rotary movements of the screw elements 15 of the upper clamping plate 11, during clamping and unclamping movements, is an axially elongated tongue 25 carried by the head 13 and adapted to be received between circumferentially spaced radially outwardly projecting stop dogs 26 fast on the screw element 15.

In accordance with my invention, a radially projecting arm 27 is secured fast to the upper head 13. Secured fast to an intermediate portion of the arm 27 and projecting upwardly therefrom is a plate-like mounting bracket 28 which is radially spaced from and generally parallel to the screw element 15. Mounting bracket 28 is formed to define an elongated aperture 29 through which, as shown, the peripheral edge portion of the nut 21 extends. As shown, the peripheral edge of said nut 21 is formed to define a plurality of circumferentially spaced radially outwardly projecting teeth 30.

Journalled for rotation on radial arm 27 on a vertical axis generally parallel to the axis of the screw element 15 is a power output shaft 31. Power operated means in the nature of a gear-head motor 32 is provided for imparting rotary movements to the shaft 31. Motor 32 is mounted to the plate-like mounting bracket as indicated at 33. Secured to and carried by the shaft 31, in overlying relationship to the arm 27, as indicated at 34, is an eccentric 35. The V-shaped pawl indicated generally at 36 journals said eccentric at the vertex thereof. As shown, pawl 36 includes pawl elements 37, 38, a selected one of which is adapted to operatively engage teeth 30, as shown particularly in FIG. 4.

Yielding means for biasing a selected one of the pawl elements 37, 38, through the opening 29, into operative engagement with teeth 30 is indicated generally by the numeral 39. Yielding means 39 comprises a lever 40 mounted for pivotal swinging movements about an axis 41 bisected by an imaginary line, not shown, drawn through the axis of the screw element 15 and rotary shaft 31. Interposed between and connected to the vertex of pawl 36 and the intermediate portion of lever 40, as indicated at 42, 43, is a coil tension spring 44. As shown particularly in FIG. 4, pivotal movements of lever 40 into the full line position thereof, wherein lever 40 is in engagement with a stop member 45, biases pawl element 37 into said operative engagement wherein nut 21 is rotated during rotary movements of shaft 31 and eccentric 35. Such rotary movements of nut 21 impart clamping movements to the upper clamping plate 11. Conversely, movements of lever 40 to the broken line position and against stop member 46 biases pawl element 38, through the medium of coil tension spring 44, into operative engagement with nut 21 whereby to impart rotary unclamping movements to the nut 21 and clamping member 11 during such rotary movements of shaft 31 and eccentric 35.

When it is desired to clamp a tire A into the position shown in FIG. 1, an operator has merely to lower screw element 15 and parts carried thereby into a position wherein the lower end of screw element 15 is received through the head 14 of plate 12. Screw element 15 is then locked against axial movement with respect to head 14 by moving an appropriate groove 16 into position to receive the opposed jaws 19. Jaws 19 are held in locking position within the grooves 16 by means of the latch bar 18a carried by arms 18. Thereafter, lever 40 is moved to the full line position of FIG. 4 and rotary movements are imparted to the nut 21 by rachet lever 36 during rotation of the shaft 31 and eccentric 35. Such rotary movements of shaft 31 and eccentric 35 cause reciprocating movements of pawl element 37 in an imaginary line bisecting the axis of shaft 31 and generally tangent to the nut 21.

During movements of the pawl element 37 away from the shaft 31, surface 47 of pawl element 37 comes into engagement, under the bias of spring 44, with one of the teeth 30 and advances same in a clockwise direction. On subsequent movements of the pawl element 37 toward the shaft 31, pawl element 37 is cammed out of engagement with teeth 30, against the bias of spring 44, by means of cam surface 48, and so on. Similarly, surfaces 49 and 50 on pawl element 38 perform similar functions when the lever 40 is swung to its broken line position of FIG. 4 whereby to impart unclamping movements to nut 21.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:

1. In a press for retreading pneumatic tire casings of the type having
   (a) a pair of generally parallel annular pressure plates adapted to engage and apply pressure to opposite side walls of a tire casing interposed therebetween,
   (b) a screw element extending axially through said plates,
   (c) one of said plates having thereon a head for releasably securing same to one end portion of said screw element,
   (d) the other of said plates having thereon a head slidably receivable over said screw element,
   (e) a nut having threaded engagement with said screw element axially outwardly of the head carried by the other of said annular plates and adapted to impart clamping pressure to said other of said plates,
   (f) the peripheral edge of said nut defining a plurality of circumferentially spaced teeth,
   (g) means limiting relative rotary movements of said screw elements with respect to said other of said plates, and
   (h) power operated means for imparting rotary movements to said nut in opposite directions, said last mentioned means including:
      (1) a radially projecting arm carried by said other of said heads,
      (2) a mounting bracket carried by said arm in radially spaced generally parallel relationship to said screw element and having an aperture therein exposing the peripheral edge portion of said nut,
      (3) a rotary shaft journalled for rotation in said arm in radially outwardly spaced relationship to said mounting bracket and aperture therein, on an axis parallel to said screw element,
      (4) an eccentric on said shaft in overlying relationship to said arm,
      (5) a V-shaped pawl journalling said eccentric at the vertex thereof and defining pawl elements at its opposite ends adapted to selectively engage said teeth whereby to impart rotary movements to said nut in a given direction upon rotation of said shaft,
      (6) power means for imparting rotary movements to said shaft,
      (7) and yielding means for biasing a selected one of said pawl elements toward operative engagement with said teeth.

2. The structure defined in claim 1 in which said last mentioned means comprises:
   (a) a lever pivotally secured to the outer end portion of said arm on an axis bisected by a line drawn through the axis of said screw element and said shaft,
   (b) a coil tension spring interposed between the vertex of said pawl and the intermediate portion of said lever, and
   (c) stop means limiting pivotal swinging movements of said lever in opposite directions.

References Cited by the Examiner
UNITED STATES PATENTS

| | | | |
|---|---|---|---|
| 2,716,258 | 8/1955 | Sugg | 18—18 |
| 2,743,481 | 5/1956 | Hawkinson | 18—18 |
| 2,745,137 | 5/1956 | Glynn | 18—18 |
| 2,826,783 | 3/1958 | Robbins | 18—18 |

J. SPENCER OVERHOLSER, *Primary Examiner.*

J. HOWARD FLINT, JR., *Examiner.*